United States Patent [19]

Zafiroglu

[11] Patent Number: 4,923,725
[45] Date of Patent: May 8, 1990

[54] ARTICLE FOR ABSORBING COOKING GREASE

[75] Inventor: Dimitri P. Zafiroglu, Wilmington, Del.

[73] Assignee: E. I. du Pont de Nemours and Company, Wilmington, Del.

[21] Appl. No.: 226,000

[22] Filed: Jul. 29, 1988

[51] Int. Cl.[5] .................. B01D 39/02; B01D 39/04
[52] U.S. Cl. .................. 428/36.4; 428/35.7; 428/36.5; 428/297; 428/283; 428/903; 428/913; 55/528; 55/DIG. 36
[58] Field of Search ............ 428/36.4, 36.5, 283, 428/35.7, 297, 903, 913; 55/913, DIG. 36, 528; 210/510.1

[56] References Cited

U.S. PATENT DOCUMENTS

| | | | |
|---|---|---|---|
| 3,169,899 | 2/1965 | Steuber | 161/72 |
| 3,227,664 | 1/1966 | Blades et al. | 2.5/260 |
| 4,392,876 | 7/1983 | Schmidt | 428/903 |
| 4,433,024 | 2/1984 | Eian | 428/903 |
| 4,469,734 | 9/1984 | Minto et al. | 428/903 |
| 4,525,411 | 6/1985 | Schmidt | 428/903 |
| 4,540,624 | 9/1985 | Sherwood | 428/283 |
| 4,650,479 | 3/1987 | Insley | 428/903 |
| 4,661,132 | 4/1987 | Thornton et al. | 55/528 |
| 4,666,763 | 5/1987 | King et al. | 428/903 |
| 4,681,801 | 7/1987 | Eian et al. | 428/283 |
| 4,689,058 | 8/1987 | Vogt et al. | 55/279 |
| 4,737,394 | 4/1988 | Zafiroglu | 428/283 |
| 4,784,892 | 11/1988 | Storey et al. | 428/283 |

OTHER PUBLICATIONS

Kirk Othmer: Encyclopedia of Chemical Technology, vol. 19, 3rd Ed., John Wiley & Sons, p. 420 ff., (1982).

Primary Examiner—Ellis P. Robinson
Assistant Examiner—Archene A. Turner

[57] ABSTRACT

A disposable article, suitable for absorbing and immobilizing grease generated during cooking, has a housing containing an absorbent bed of particles and polyolefin microfibers.

10 Claims, 1 Drawing Sheet

F I G. 1
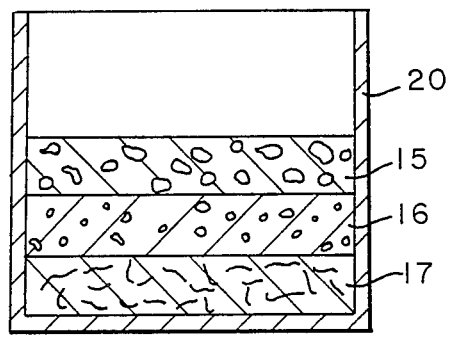
F I G. 2
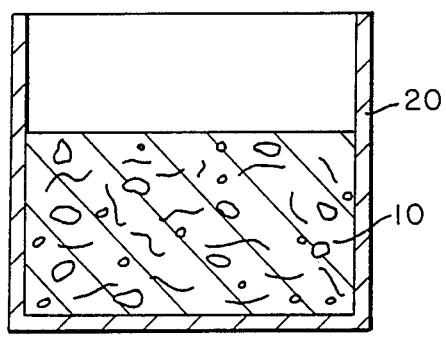
F I G. 3
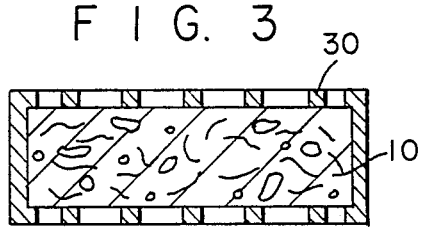

ARTICLE FOR ABSORBING COOKING GREASE

BACKGROUND OF THE INVENTION

1. Field of the Invention

This invention relates to a disposable article for absorbing greases generated during cooking. More particularly, the invention concerns such an article, which comprises a specially constructed absorbent particle bed.

2. Description of the Prior Art

During the cooking and frying of foods, especially meats, on stoves and cooking ranges, fats, oils and greases are generated, often as air-borne "mists". These are referred to herein collectively as "grease". Animal-fat grease generally condenses on and around grills at maximum temperatures of about 180 ° F. (82° C.), at which temperatures the viscosity of the grease is low and the grease flows quite readily, but at temperatures below about 100 ° F. (38° C.), the grease becomes very viscous. Many cooking oils, such as those used in deep-fat frying, are liquids at room temperature and remain liquid even after moderate cooling.

In many homes and restaurants, stoves and cooking ranges are equipped with exhaust hoods and fans that draw the cooking fumes from the cooking surface, through a filter and ducting, to outside the building or back into the room. Several filters, disposable and non-disposable, have been suggested for this purpose. For example, Vogt et al, U.S. Pat. No. 4,689,058, describes several such devices and suggests the use of a stove hood filter comprising a primary metal mesh filter element and a nonwoven, secondary disposable filter. After prolonged use metal mesh filters become clogged and must be removed, the deposited fat and grease dissolved and the screens throughly washed before being replaced in the system.

When filters are absent or inefficient, the grease can deposit on surfaces of the hood, exhaust fan and ducts leading outside the building and even on the roof of the building. Such deposits are not only noxious and malodorous, but also fire hazards.

Liquid grease is often disposed of by simply being poured into a container which is then discarded with ordinary garbage. Such disposal often leads to sloppy and hazardous spills. Some spillage can be avoided by solidifying the grease. However, some greases, particularly cooking oils, remain liquid even after cooling.

A need still exists for a disposable device that can effectively absorb and immobilize grease generated during cooking. The purpose of the present invention is to provide such an absorbent article.

SUMMARY OF THE INVENTION

The present invention provides a disposable article for trapping and immobilizing cooking grease. The article comprises a bed of absorbent material within a container. The container has an inlet through which the grease can enter to come into contact with the bed. The bed absorbent material is composed essentially of particles, preferably of polyolefin polymer, and polyolefin microfibers. The bed has an inlet portion that includes at least one-quarter of the total depth of the bed. The inlet portion contains a multiplicity of passages and has a free volume of at least 50%, preferably at least 851 %. At least 25%, preferably at least 50%, of the total cross-sectional area of the inlet portion of the bed is occupied by passages having a width of at least 2 mm. The microfibers are present in regions of the bed that have a free volume of at least 80%, preferably at least 85%. The microfibers amount to at least 30% of the total bed volume and preferably no more than about 65%.

In certain preferred embodiments of the invention, the bed has a depth in the range of 1 cm to 1 meter; the polyolefin is polyethylene or polypropylene; the polyolefin microfibers are composed of melt-blown polypropylene or of flash-spun polyethylene; and the particles are of polyproylene microfoam. The particles and microfibers can be present in the bed as a substantially homogeneous mixture or in layers. When the bed is a homogeneous mixture, it is preferred that the inlet to the bed be covered by a open-mesh member having an open area of at least 50%, and that the bed be in the shape of a planar member of 2 to 5 cm thickness. When the particles and microfibers are in layers, it is preferred that the bed include a first layer which is located closest to the inlet and is composed essentially of the particles and a last layer which is located farthest from the inlet and is composed essentially of the polyolefin microfibers, and that the bed have a depth in the range of 10 cm to 1 meter.

BRIEF DESCRIPTION OF THE DRAWINGS

The invention will be better understood by reference to the attached drawings in which absorbent articles of the invention are depicted in cross-section. FIG. 1 depicts a such an article comprising open-ended container 20 holding an absorbent bed 11 in which particles or microfibers of different materials and sizes are arranged in three different layers 15, 16 and 17. FIG. 2 depicts an absorbent article of the invention in which absorbent bed 12 comprises a blend of particles and microfibers in open-ended container 20. FIG. 3 depicts an absorbent bed 13 contained between open mesh walls.

The absorbent devices of FIGS. 1 and 2 are particularly useful for catching and immobilizing hot grease drippings that run off grills. Absorbent devices of FIG. 3 are particularly suited for installation in conventional kitchen hood exhaust ducts for trapping and immobilizing air-borne cooking grease.

DETAILED DESCRIPTION OF PREFERRED EMBODIMENTS

In accordance with the present invention the absorbent material is composed essentially of particles and polyolefin microfibers. The bed has an inlet portion that includes at least one-quarter of the total depth of the bed. The inlet portion has a multiplicity of passages through it which provide the inlet portion with a free volume of at least 50%, preferably at least 85%. At least 25%, preferably at least 50%, of the total cross-sectional area of the inlet portion of the bed is occupied by passages having a width of at least 2 mm. The microfibers are present in regions of the bed that have a free volume of at least 80% (preferably at least 85%). The microfibers amount to at least 30% of the total bed volume. Such construction of the bed permits more viscous fractions of grease to become trapped near the inlet of the bed without blocking less viscous fractions from flowing into the remainder of the bed, where the less viscous fractions can be trapped by the microfibers of the bed.

Suitable materials for the particles of the bed include small pieces of polymeric film, plastic cubes, microfoam particles, and the like. Preferably, the particles of the absorbent bed material are flash-spun particles of foamed polypropylene or polyethylene prepared by the general techniques of Blades and White U.S. Pat. No. 3,227,664, the disclosure of which is hereby incorporated herein by reference. Such polyolefin particles also can be prepared by granulating a polypropylene microfoam sheet (e.g., of the type sold by Ametek, Inc.) into particles with a Sprout-Bauer DSF-Granulator set to produce particles of ¼- to 1-inch nominal size. The nominal sizes refer to the screen sizes used in the machine.

Instead of the "particles" of the bed being individual particles, the "particles" could be interconnected as in a sponge or an open-cell sponge. These structures would act in substantially the same way to obtain substantially the same results as the particles of the invention. Thus, for the purposes of this invention, these structures would be equivalent to the particles, provided of course the free volume and passageway criteria described below. Accordingly, the term "particles", as used herein, is intended to include such sponge and open-cell structures.

The polyolefin microfibers for use in the present invention can be in the form of synthetic pulps of polypropylene or polyethylene (see Kirk-Othmer: Encyclopedia of Chemical Technology, v. 19, 3rd ed., John Wiley & Sons, p. 420ff., 1982). Among suitable commercial synthetic polyethylene pulps are "Pulpex", sold by Hercules, Inc., and or "Pulplus", sold by E. I. du Pont de Nemours & Co. Such synthetic pulps are made by known "spurting" or flash-spinning techniques, such as those disclosed by Blades and White, U.S. Pat. No. 3,081,519, the disclosure of which is hereby incorporated herein by reference. Another source of microfibers is lightly consolidated flash-spun polyethylene sheet of the type disclosed by Steuber, U.S. Pat. No. 3,169,899, which disclosure is hereby incorporated herein by reference. This sheet of Steuber can be granulated, for example with a Sprout-Bauer DSF-Granulator set to produce particles of 3/16-inch nominal size which are suitable for use in the present invention. The granulated product is a highly voluminous mass of highly fibrillated fibrous particles.

Other useful components of the absorbent articles of the invention can be prepared readily and inexpensively. For example, container 20 of FIGS. 1 and 2 can be in the form of a wax-coated cardboard carton. Such cartons are particularly useful for collecting and immobilizing grease generated around grills (e.g., a half-gallon carton containing 4 ounces of absorbent bed or a 2-gallon container containing one pound of absorbent bed. The absorbent bed material can just as readily be held in containers such as buckets, jars, jugs, tin cans, 55-gallon drums and the like.

In other embodiments of the grease-absorbing article of the invention, the absorbent bed can be held in a container that is formed with an open mesh structure, such as an open-mesh screen, perforated metal plate, open-mesh fabric or the like (e.g., a ¼-inch mesh, 50% open area, woven polypropylene fabric, such as is sold by Amoco Fabrics Co.). Such absorbent articles can be made in cylindrical form or in sheet form, depending on the desired location in which the articles are to be used. Such sheets, pads or cylinders can be placed where condensed grease drips (e.g., on floors around grills, on roof-tops, under exhaust ducts, etc.). Such articles of the invention are particularly suited for absorbing and immobilizing cooking exhaust grease that condenses over and around grills, deep fat fryers, frying pans, exhaust ducting, suction fans, roofs, etc.

When the absorbent bed within the absorbent article of the invention product is of substantial depth (e.g., of greater than 10 cm), it is preferable that the microfibers be concentrated within the layers farthest from the inlet end of the bed, to allow full saturation without premature clogging of the upper layers by the more viscous fractions of the grease. When the absorbent article is in the form of a relatively thin (e.g., 0.5 cm to 5 cm) batt, blanket or sheet, it is prefered that particles and microfibers form a thoroughly mixed bed within the container.

The ability of various bed materials to absorb and immobilize grease was evaluated by the following two test procedures. Each test employed a 400-$cm^3$ sample of the test absorber bed in a 500-$cm^3$ glass beaker. Animal-fat grease, which had been collected from an exhaust duct over a hamburger grill and heated at the desired test temperature in a hot air oven for two hours, was used in each test.

For the grease absorption test, 200 $cm^3$ of the grease is poured within a 10-second period into the beaker containing the test bed material. The test is performed with grease at a temperature of about 95° F. or at about 180° F. The depth to which the grease flowed into the bed is observed. If the grease entered and distributed itself throughout the bed and did not accumulate in or block the inlet layers of the bed, the test bed is considered to be satisfactory at the test temperature.

Upon completion of the grease absorption test, the grease immobilization test is performed by placing the test beaker and contents in an oven at 180° F. and heating for two hours. The beaker is removed and immediately tipped over (i.e., to a horizontal position), to determine if the bed and grease were immobilized (i.e., would not flow out of the beaker). Those beds from which grease flowed at 180° F. flowed were re-tested with fresh samples, which were held in the oven for two hours at a temperature of 90° F. (instead of the previously employed 180° F.) before the tipping test was repeated. Flow of grease from the bed is considered a failure of the test bed to pass the grease immobilization test.

To determine the free volume of the beds and the widths and areas of bed passages, the following methods were used. Free volume was determined from measurements of the weight and density of different bed layers and from the density of the material from which the layer was composed, and calculated as follows:

$$\% \text{ free volume} = 100(D_m - D_b)/D_m$$

wherein $D_m$ is the density of the material from which the particles or microfibers are formed and $D_b$ is the bulk density of the bed or a layer thereof.

Passage cross-sectional dimensions between particles were measured under a magnifying glass with the help of a scale and oblique lighting.

EXAMPLES 1-4

Samples of absorbent articles made in accordance with the invention were prepared, tested and compared to other materials in their capacity to trap and immobilize grease. These examples and comparisons clearly demonstrate the advantages of beds constructed in accordance with the invention over beds constructed with materials and geometries that are outside the invention.

Several materials were used in preparing the beds of the Examples. Polypropylene microfoam particles were prepared by granulating a polypropylene microfoam sheet, purchased from Ametek, Inc. with a Sprout-Bauer DSF-Granulator operating with screens of ¾ inch and ¼ inch nominal size. Polyethylene microfibers were prepared with the same machine, operating with 3/16 inch nominal size screens, by granulating a lightly consolidated film-fibril sheet of the type described by Steuber, U.S. Pat. No. 3,169,899 to a 3/16-inch nominal size. Polypropylene microfibers were obtained by chopping pieces of an absorbent mat of melt-blown polypropylene fibers purchased from New Pig Corporation of Altoona, Pa. in a laboratory blender operating at 800 rpm for 2 minutes. All sizes of particles quoted in the examples refer to the granulator nominal screen sizes that were employed to prepare the particles.

For Example 1, a three-layer bed of the type shown in FIG. 1 was constructed and tested. The layer closest to the inlet consisted essentially of particles of chopped polypropylene microfoam of ¾-inch nominal size. The second layer consisted essentially of particles of chopped polypropylene microfoam of ¼-inch nominal size. The third layer, which was farthest from the inlet, consisted essentially of polyethylene film-fibril microfibers.

For Example 2, the three layers of the absorbent bed of Example 1 were blended to form a absorbent bed of mixed particles and microfibers.

For Example 3, the the bed was constructed with the same inlet and middle layer as in Example 1 but the polyethylene microfibers of the layer farthest from the inlet were replaced by polypropylene microfibers.

For Example 4, the three layers of Example 3 were blended as in Example 2, to form a mixed microfiber and particle bed.

Several comparison beds were made of single materials. These absorbent beds were composed solely of: for Comparison a, polyethylene microfibers of the type used for the third layer of the bed of Example 1; for Comparison b, polypropylene microfibers of the type used in the third layer of the bed of Example 3; for Comparison c, sand; for Comparison d, sawdust; and for Comparison e, pine wood shavings. A fifth comparison sample, Comparison f was constructed with a bed of three layers of wood in which the inlet layer of the bed was of pine-bark chips, the middle layer was of wood pine shavings and and the layer farthest from the inlet was of sawdust.

Table I summarizes the construction of the absorbent bed of each example and comparisons. The table lists for each bed layer, its depth, density, free volume, percent of the total bed volume and percent of the cross-sectional area of the bed that is occupied by passages of at least 2-mm in width. Table 2 summarizes the results of the grease absorption and grease immobilization tests.

TABLE 1

| | Bed Construction | | | | |
|---|---|---|---|---|---|
| Sample Of Invention | Depth cm | Density g/cm₃ | % Free Volume | % of bed volume | % of Area ≧2 mm wide |
| Ex. 1 | | | | | |
| Layer 1 | 2.5 | 0.02 | 71 | 22 | >50 |
| Layer 2 | 3.8 | 0.03 | 57 | 33 | >30 |
| Layer 3 | 5.1 | 0.10 | 89 | 45 | 0 |
| Ex. 2 | 11.4 | 0.04 | 95 | 100 | >50 |
| Ex. 3 | | | | | |
| Layer 1 | 2.5 | 0.02 | 71 | 22 | >50 |
| Layer 2 | 3.8 | 0.03 | 57 | 33 | >30 |
| Layer 3 | 5.1 | 0.06 | 93 | 45 | 0 |
| Ex. 4 | 11.4 | 0.04 | 96 | 100 | >50 |
| Comparisons | | | | | |
| a | 11.4 | 0.10 | 89 | 100 | 0 |
| b | 11.4 | 0.06 | 93 | 100 | 0 |
| c | 11.4 | 5.3 | 79 | 100 | 0 |
| d | 11.4 | 0.16 | 64 | 100 | 0 |
| e | 11.4 | 0.55 | 84 | 100 | 0 |
| f | | | | | |
| Layer 1 | 5.1 | 0.25 | 44 | 45 | >38 |
| Layer 2 | 2.5 | 0.06 | 84 | 22 | <1 |
| Layer 3 | 3.8 | 0.16 | 64 | 33 | 0 |

TABLE 2

| Grease Absorption and Immobilization Tests | | | | |
|---|---|---|---|---|
| | Absorption Tests* | | Immobilization Tests | |
| | 95° F. | 180° F. | 95° F. | 180° F. |
| Of Invention | | | | |
| Ex. 1 | Pass (0) | Pass (0) | Pass | Pass |
| Ex. 2 | Pass (0) | Pass (0) | Pass | Pass |
| Ex. 3 | Pass (0) | Pass (0) | Pass | Pass |
| Ex. 4 | Pass (0) | Pass (0) | Pass | Pass |
| Comparisons | | | | |
| a | Fail (11) | Pass (1) | Fail | Fail |
| b | Fail (6) | Fail (3) | Fail | Fail |
| c | Fail (11) | Fail (4) | Fail | Fail |
| d | Fail (11) | Fail (5) | Fail | Fail |
| e | Fail (10) | Pass (0) | Fail | Fail |
| f | Fail (7) | Fail (2) | Fail | Fail |

*The number in parentheses is the measured distance in cm from the bottom of the bed to the point of deepest penetration of the grease into the bed; 11 cm represents no grease entry and 0 complete entry.

Table 2 clearly demonstrates the superiority of the products of this invention (Examples 1–4) over all the comparisons (a–f). In beds according to the invention, cooled (to 90° F.) grease entered the bed readily and was absorbed evenly. After being heated to 180° F., the grease still was totally immobilized within the bed.

The mixed beds of Example 2 and 4, in comparison to the three layer-beds of Example 1 and 3 respectively, were only slightly less effective in allowing viscous grease to distribute itself quickly throughout the bed, but about equally effective in immobilizing the grease. However, all four beds constructed in accordance with the invention were far superior to any of the comparison beds in absorbing and in immobilizing grease.

In contrast to the absorbent beds of the examples, all of the beds of the comparison samples tended to clog with grease at temperatures under 150° F. (66° C.); at temperatures of about 100° F. (38° C.) or lower, clogging was very rapid. Even when grease was introduced into beds of such materials at temperatures of 180° F. (82° C.) or higher, and then the bed and trapped grease were cooled to 90° F.–100° F. (32°–38° C.), the trapped grease remained sufficiently fluid to pour out of the bed. Note also, that even when absorbers were made of 100% polyolefin microfibers, grease could be introduced into such beds only at high temperatures and then the inlet layers of the bed near the entrance usually clogged rapidly and greatly limited the ability of the remaining parts of the bed to absorb grease.

In another test, the polyolefinic beds of Examples 1–4, were flooded with water and then the water was drained off. The thusly wetted beds of Examples 1-4 performed in a substantially identical fashion to the dry beds in grease absorption and immobilization test. In contrast, such wetting of the wood beds of Comparisons d, e and f, made the performance of those beds even less effective in the grease absorption and immobilization, than when the beds were tested without water present.

I claim:

1. A cooking-grease trapping-and-immobilizing disposable article comprising
   a multi-layered bed of absorbent material in a container,
   said absorbent material consisting essentially of particles and polyolefin microfibers, the microfibers amounting to at least 30% of the bed volume,
   said container having an inlet through which the grease can enter and come into contact with the surface of the first layer of the absorbent material,
   said first layer being located closest to the container inlet, consisting essentially of particles, and having a depth equal to at least one-quarter of the total depth of the bed, a free volume of at least 50%, and a multiplicity of passages therethrough, and at least 25% of the first layer total cross-sectional area consisting of passages having a width of at least 2 millimeters,
   said microfibers being included in a second or subsequent layer of the bed having a free volume of at least 80%.

2. An article in accordance with claim 1 wherein the microfibers amount to no more than 65% of the bed volume.

3. An article in accordance with claim 2 wherein the second or subsequent layer containing the microfibers has a free volume of at least 85%.

4. An article in accordance with claim 1 wherein the bed has a total depth in the range of 1 centimeter to 1 meter and the particles are of polyolefin.

5. An article in accordance with claim 4 wherein the polyolefin particles consist essentially of polypropylene microfoam and the polyolefin microfibers consist essentially of melt-blown polypropylene or of flash-spun polyethylene.

6. An article in accordance with any preceding claim wherein the first layer consists essentially of said particles and a last layer, located farthest from said container inlet consists essentially of the microfibers and the total depth of the bed is in the range of 10 centimeters to 1 meter.

7. A cooking-grease trapping-and-immobilizing disposable article comprising
   a bed of absorbent material in a container,
   said absorbent material being a substantially homogeneous mixture consisting essentially of particles and polyolefin microfibers, the microfibers amounting to at least 30% of the bed volume,
   said container having an inlet through which the grease can enter and come into contact with the surface of the absorbent material,
   said bed having a free volume of at least 80%, and a multiplicity of passages therethrough, at least 25% of the total cross-sectional area of the bed consisting essentially of passages having a width of at least 2 millimeters.

8. An article in accordance with claim 7 wherein the bed has a total depth in the range depth in the range of 1 centimeter to 1 meter, the particles are of polyolefin.

9. An article in accordance with claim 8 wherein the polyolefin particles consist essentially of polypropylene microfoam and the polyolefin microfibers consist essentially of melt-blown polypropylene or of flash-spun polyethylene.

10. An article in accordance with any one of claims 7 through 9 wherein the surface of the bed nearest the inlet is covered by an open-mesh member having an open area of at least 50% and the bed is in the shape of a flat planar member having a thickness in the range of 2 to 5 cm.

* * * * *